Figure 4:
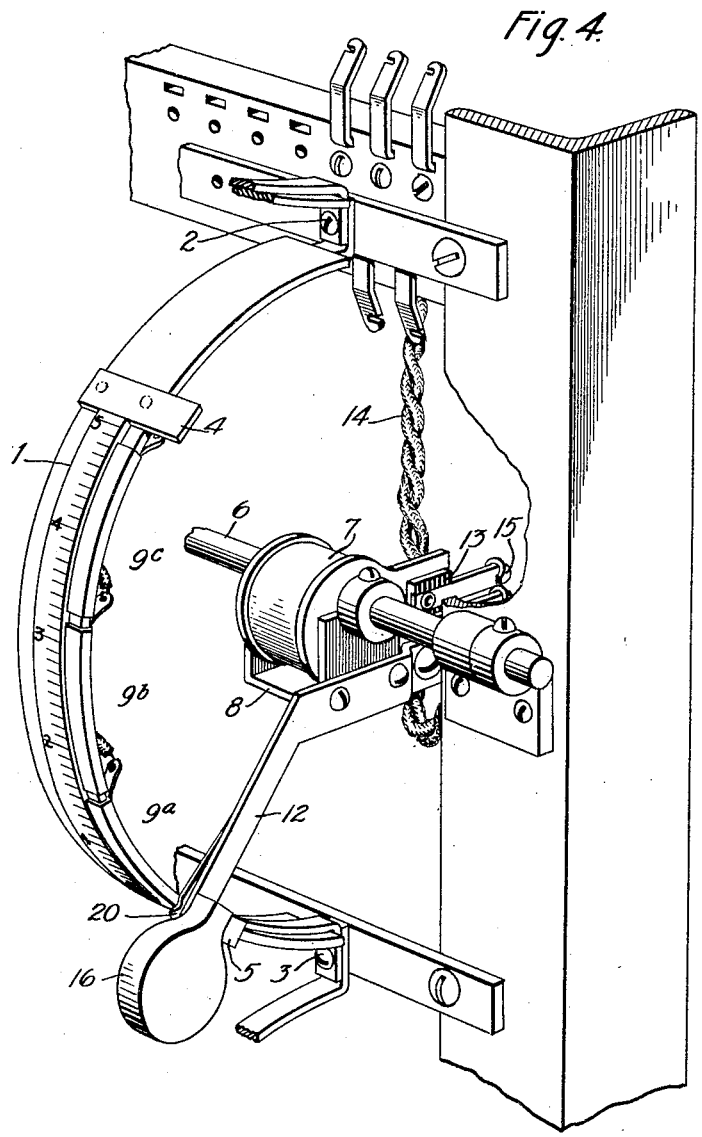

March 6, 1928. 1,661,249
G. DEAKIN
TIMING DEVICE
Filed May 18, 1925 2 Sheets-Sheet 1
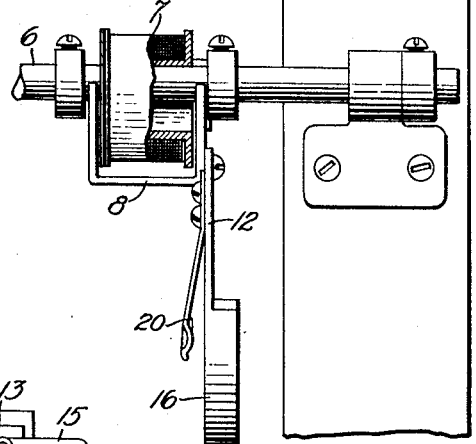
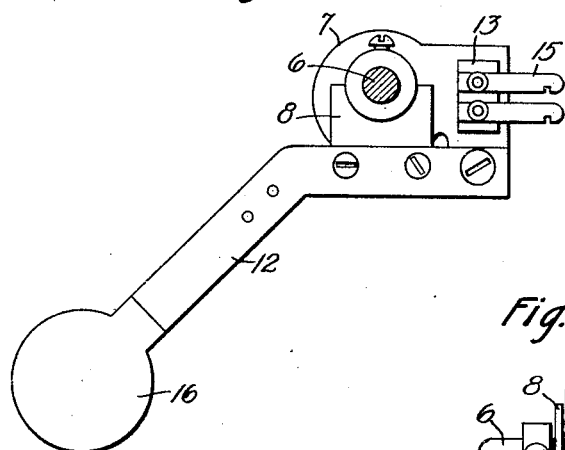
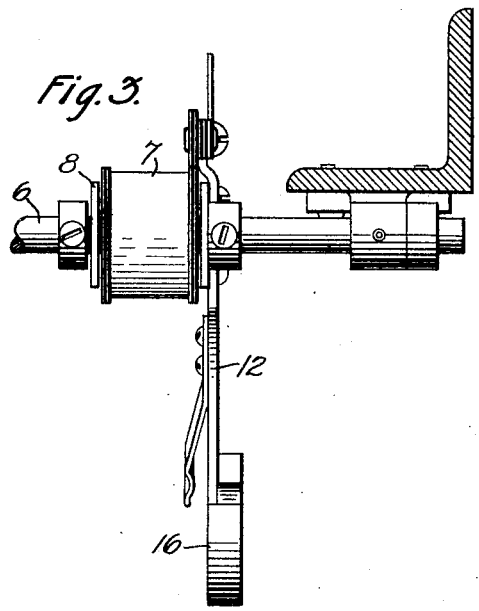
Inventor:
Gerald Deakin
by J. E. Roberts  Att'y.

Patented Mar. 6, 1928.

1,661,249

UNITED STATES PATENT OFFICE.

GERALD DEAKIN, OF ANTWERP, BELGIUM, ASSIGNOR, BY MESNE ASSIGNMENTS, TO WESTERN ELECTRIC COMPANY, INCORPORATED, A CORPORATION OF NEW YORK.

TIMING DEVICE.

Application filed May 18, 1925, Serial No. 30,970, and in Great Britain June 26, 1924.

This invention relates to timing devices such as are used in telephone exchange system, and it is the object of this invention to provide an improved device of this character.

In accordance with the present invention such a device comprises a shaft constantly rotating at a definite speed having loosely mounted thereupon an indicating or recording member movable over a graduated scale, electromagnetic means being provided adapted to clutch the indicating member securely into engagement with the shaft so that the pointer is rotated thereby over the scale. Further, the member may be provided with contact closing means adapted to engage contacts located at suitable positions upon the graduated scale so as to open or close an electrical circuit at a definite time or to maintain such a circuit opened or closed for a definite time interval.

The invention will be more fully understood from the following description taken in connection with the accompanying drawings in which one practical embodiment of the invention is illustrated by way of example.

In the drawings Fig. 4 is a general view in perspective of the timing apparatus in accordance with the present invention.

Figs. 1, 2 and 3 show various views of the movable recording member.

The graduated scale consists of a semi-circular member 1 of sheet fibre or other suitable material of any convenient width secured at the top and bottom of the apparatus by supporting screws 2 and 3. The scale is provided with upper and lower stops 4 and 5 and the space between these stops is graduated in any desired manner to represent time. As indicated, the scale is divided into five equal main divisions representing five minutes and each minute is divided into tenths.

In the center of the circle formed by the graduated scale is a shaft 6 which is continuously rotated by any suitable means at a definite rate of speed. Associated with but separate from the shaft 6 is a spool 7, wound with a suitable number of turns, and a U shaped pole piece 8.

An indicating member or pointer 12 is secured to the pole piece 8. The pointer carries at its outer end a disc 16 which is positioned so as to move along, and adjacent to, one side of the graduated scale between the upper and lower stops 4 and 5.

A suitable terminal block of insulating material 13 is provided, insulated conductors 14 connecting the coil and pointer with suitable terminals 15 located thereupon.

In operation the shaft 6 is rotated at any desired rate of speed and normally the pointer, coil 7 and pole piece 8 carrying the same remains in normal position with the pointer in engagement with the lower stop 5. Upon the closure of the circuit of the coil 7, the pole piece grips the shaft 6, thus completing the magnetic path through the shaft and the subsequent rotation of the shaft 6 causes the disc 16 and pointer 12 to be raised towards the upper stop 4 at a definite rate of speed, equal to the speed of the shaft. The latter is adjusted so as to enable the disc to reach the upper stop in a definite interval of time, the scale being graduated accordingly. In the example illustrated in the drawings, the time taken to move the disc 16 from the lower to the upper stop is assumed to be five minutes, and the position reached by the pointer 12 is an indication of the time that the circuit of the coil 7 has been closed.

In automatic telephone systems the circuit of the coil 7 may be closed in a number of ways depending upon the time which it is desired to measure; for example, it may be desired to measure the time elapsing between the removal of the receiver by the subscriber and the commencement of dialling. To effect this the circuit of the coil will be controlled by the usual line relay or a relay controlled thereby. Immediately the line relay energizes the circuit of the coil 7 is closed and the pointer 12 is raised towards the upper stop. When the subscriber commences dialling the circuit of the coil 7 will be opened by any suitable means so that the pointer will cease to be raised further and will be restored to normal position by the weight of the disc 16. If desired of course, it may be arranged to provide the pointer 12 with means for recording the time taken upon a chart.

By providing the pointer with a brush or brushes 20 at the graduated scale with the contact strips 9$^a$, 9$^b$, 9$^c$ in the path of these brushes, circuit including these brushes and strips may be closed after an elapse or a definite time interval. It may also be arranged for the strips to be of definite length so that a circuit including strips and brushes may be closed for a definite time interval and to be opened at the end of this time interval.

It will be obvious that a device of this character has a very large number of uses in telephone systems where it is desired to measure time and to close or open, or maintain closed or open, contacts for a definite time interval.

What is claimed is:

1. A timing device comprising a horizontal shaft rotating at a definite speed, an indicating member loosely mounted thereon, a graduated scale vertically mounted in an arc of a circle associated with said member, an electromagnet mounted on said member and surrounding the shaft for clutching the member into engagement with the shaft so that it is driven upward along the scale to indicate the length of time the electromagnet is energized.

2. A timing device comprising a horizontal shaft rotating at a definite speed, an indicating member loosely mounted thereon, a graduated scale vertically mounted in an arc of a circle associated with said member, an electromagnet mounted on said member and surrounding the shaft for clutching the member into engagement with the shaft so that it is driven upward along the scale to indicate the length of time the electromagnet is energized, and a gravity restoring means for restoring the indicating member to normal when the electromagnet is deenergized.

3. A timing device comprising a horizontal shaft rotating at a definite speed, a graduated scale mounted vertically in an arc of a circle, an indicating member loosely mounted on the shaft, an electromagnet mounted on the indicating member, a U shaped polepiece secured to the indicating member which, upon energization of the electromagnet engages against the shaft to cause the indicating member to move upward along the graduated scale, and a gravity restoring means consisting of a weighted disc secured to the indicating end of said indicating member to cause the indicating member to return to normal upon the deenergization of the electromagnet.

In witness whereof, I hereunto subscribe my name this 28 day of April A. D., 1925.

GERALD DEAKIN.